United States Patent [19]

Johnson

[11] 4,439,775
[45] Mar. 27, 1984

[54] MULTIPLE SPEED PRINTER

[75] Inventor: Jerome L. Johnson, Lake Orion, Mich.

[73] Assignee: Centronics Data Computer Corp., Hudson, N.H.

[21] Appl. No.: 353,125

[22] Filed: Mar. 1, 1982

[51] Int. Cl.³ .......................................... G01D 15/18
[52] U.S. Cl. .................................................. 346/75
[58] Field of Search ........................ 346/1.1, 75, 140

[56] References Cited

U.S. PATENT DOCUMENTS

| | | | |
|---|---|---|---|
| 3,938,163 | 2/1976 | Fujimoto et al. | 346/75 |
| 3,964,591 | 6/1976 | Hill et al. | 346/75 X |
| 3,972,052 | 7/1976 | Atumi et al. | 346/75 |
| 4,025,925 | 5/1977 | Jensen et al. | 346/75 |
| 4,045,770 | 8/1977 | Arnold et al. | 346/75 |
| 4,115,787 | 9/1978 | Futimoto et al. | 346/75 |
| 4,115,788 | 9/1978 | Takano et al. | 346/75 |
| 4,172,417 | 9/1977 | Fardeav et al. | 101/114 |
| 4,216,480 | 8/1980 | Buehner et al. | 346/75 |

Primary Examiner—Donald A. Griffin
Attorney, Agent, or Firm—Kenway & Jenney

[57] ABSTRACT

A dot matrix printer has a dot generator which projects dots through a dot selector and dot deflector towards a recording medium. Dots used for printing are selectively charged by the dot selector and deflected vertically by the dot deflector for printing on the recording medium. The dot generator moves horizontally at a speed S across the recording medium. Dots not used for printing are not charged, not deflected, and are collected in a gutter. A data input designates to the dot selector the character to be printed. A speed selector is operable to select standard speed printing $S_1$, or high-speed printing $S_2$. Speed $S_2$ is equal to some factor Z multiplied by standard speed $S_1$. If the standard speed printing is selected, the dot selector accesses the standard speed character matrix memory and receives dot position information corresponding to the designated character. The dot position information comprises X adjacent and parallel vertical scans, each scan comprising a column of Y potential dot, or matrix, positions. The dot selector codes each sequential dot with the position information for the next sequential matrix position of the scan. If high-speed printing $S_2$ has been selected, the dot selector accesses the high-speed character matrix memory and receives dot position information corresponding to the designated character. The dot position information comprises X adjacent and parallel vertical scans, each scan having Y/Z potential dot, or matrix, positions. Since the matrix positions in the column of the scan have been reduced from Y to Y/Z, the standard scan time T is reduced to T/Z and the scan time is reduced in proportion to the increase in print speed.

4 Claims, 3 Drawing Figures

MULTIPLE SPEED PRINTER

BACKGROUND

The present invention relates to dot matrix printers, and more specifically, to a method and apparatus for providing a variable printing speed in such printers.

Typically, dot matrix printers, and ink jet printers in particular, have a nozzle, or printhead, which projects ink drops, or dots, towards a recording medium. The dots are deflected vertically in parallel and adjacent scans while the print nozzle moves horizontally across the recording medium, usually paper, to print a line of characters. Each scan consists of a vertical column of matrix, or potential dot, positions. The printer completes each scan, or column of potential dot positions, before moving to the next scan. Where the printhead moves horizontally at a constant speed during each scan, it is well known to those skilled in the art that a skew will be introduced into the characters in the direction of printhead motion unless a means for compensating for the skew is provided. One such skew compensation means is shown in U.S. Pat. No. 3,338,163 which is hereby incorporated by references.

It is desirable in a dot matrix printer to have a slower speed, higher quality print capability and a faster speed, lower quality print capability. One prior art attempt at providing this multispeed capability is to double the print speed while deleting alternate scans. This method, however, has produced a noticeable slant in the characters even where a skew compensation means has been employed in that while printhead speed is doubled, the time required to complete each scan and the amount of skew compensation has remained unchanged. Moreover, the slant is always in the direction of printhead motion so that if a first line of characters is printed from left to right, the characters will noticeably slant to the right; then if the second line of characters is printed from right to left on the return motion of the printhead, the characters will noticeably slant to the left. Printing in this manner is so disturbing to the eye that the method is limited to unidirectional printing. Consequently, the time spent on the return travel of the printhead once it reaches the right side border cannot be utilized for printing and is lost, reducing overall print speed. Increasing print speed, of course, being the very object of this method.

Other prior art in the dot matrix printing art is shown in U.S. Pat. Nos. 4,172,417; 4,115,788; 4,115,787; 4,045,770; 4,025,925; 3,972,052; and 3,938,163.

SUMMARY

The present invention overcomes the shortcomings of the prior art outlined above by providing a multispeed dot matrix printing apparatus and method in which the time required to complete each scan is reduced in proportion to the increase in the speed of the printhead. For example, if the printhead speed is doubled, the time required to complete each scan is cut in half.

One advantage of this method is that the increase in printing speed does not introduce a slant in the characters, since scan time is reduced in proportion to the increase in print speed. Since the instant inventive printing method introduces no slant in the characters, bidirectional printing can be employed both at standard speed and in the high-speed printing mode. An increase in overall print speed over the prior art method is, therefore, realized, since the time spent in the return travel of the printhead is not lost.

It is, therefore, an object of the present invention to provide an improved method and apparatus for dot matrix printing.

It is a further object to provide a method and apparatus for dot matrix printing having variable printing speed capability.

It is a further object to provide a dot matrix printing method and apparatus which provides a multiple printing speed capability without introducing slant into the printed characters.

Yet another object is to provide a dot matrix printing apparatus and method which reduces printer scan time in proportion to the increase in print speed.

A still further object is to provide a method and apparatus for dot matrix printers wherein the printer accesses different character matrix memories in correspondence with the selection of different printing speeds.

These and other objects, advantages, and novel features of the present invention will become apparent from the following detailed description of the invention taken in conjunction with the accompanying drawings.

DESCRIPTION OF THE PREFERRED EMBODIMENT

The present invention is a method and apparatus for providing multispeed dot matrix printing. The invention will be described as applied to an ink jet printer, but it is to be understood that the teachings herein are applicable to virtually any dot matrix printing system.

Figure 1:
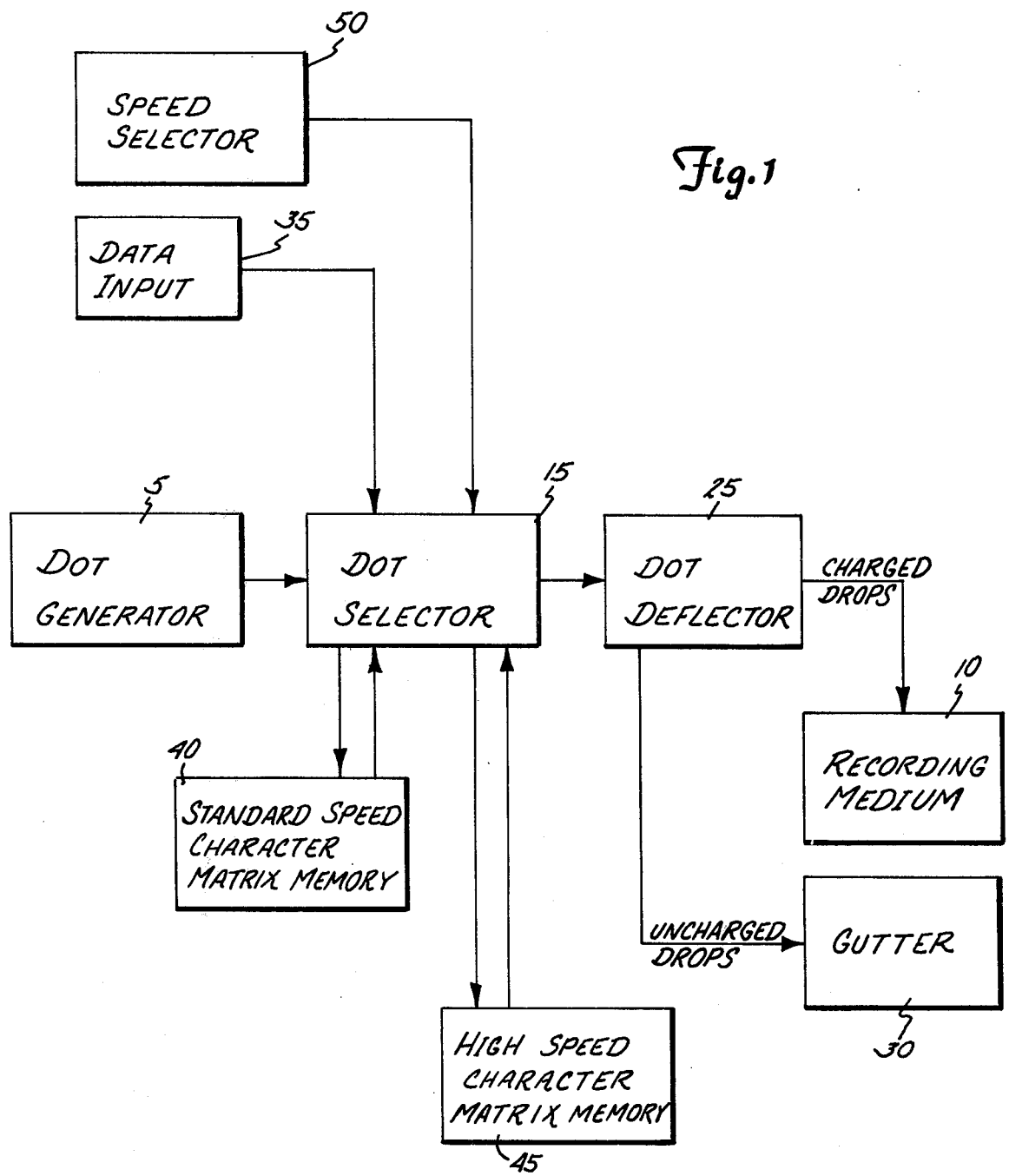
FIG. 1 shows a block diagram of the method and apparatus of the present invention.

The basic structure of ink jet printers is well-known and therefore the system is shown only schematically in FIG. 1, eliminating unnecessary structural detail. A typical construction of an ink jet system printer is shown in U.S. Pat. Nos. 3,878,517; and 3,938,163.

To briefly describe the basic ink jet printing system, minute ink drops, or dots, are projected from an ink dot generator, or nozzle, 5 towards a recording medium 10, passing from the generator 5 through a dot selector, or charge electrode, 15 and a dot deflector, or deflection plates, 25. The deflection plates 25 are maintained at a constant voltage. The dot selector 15 selectively charges those ink dots to be used for printing. The charged dots are then deflected vertically in proportion to their charge by the dot deflector 25 whereafter they impinge on the recording medium 10 to form a dot at a prescribed matrix position. Dots not used for printing are left uncharged by the dot selector and are, thus, not deflected by the dot deflector, and pass directly into a gutter 30 for recirculation.

As the ink dots are deflected vertically by the deflection plates 25, the dot generator 5, dot selector 15, and dot deflector 25 are moved horizontally at some constant speed S to permit a line of characters to be printed horizontally across the page by the vertically deflected dots. Hence, the dot generator 5, dot selector 15, and dot deflector 25 are mounted on a carriage (not shown)

which is horizontally movable with regard to the recording medium 10. Note that a skew compensating means such as that shown in U.S. Pat. No. 3,938,163 may also be included. With bidirectional printing, a bidirectional skew compensating means such as that shown in U.S. Pat. No. 4,321,609 could be employed; said patent being hereby incorporated by reference.

Figure 2:
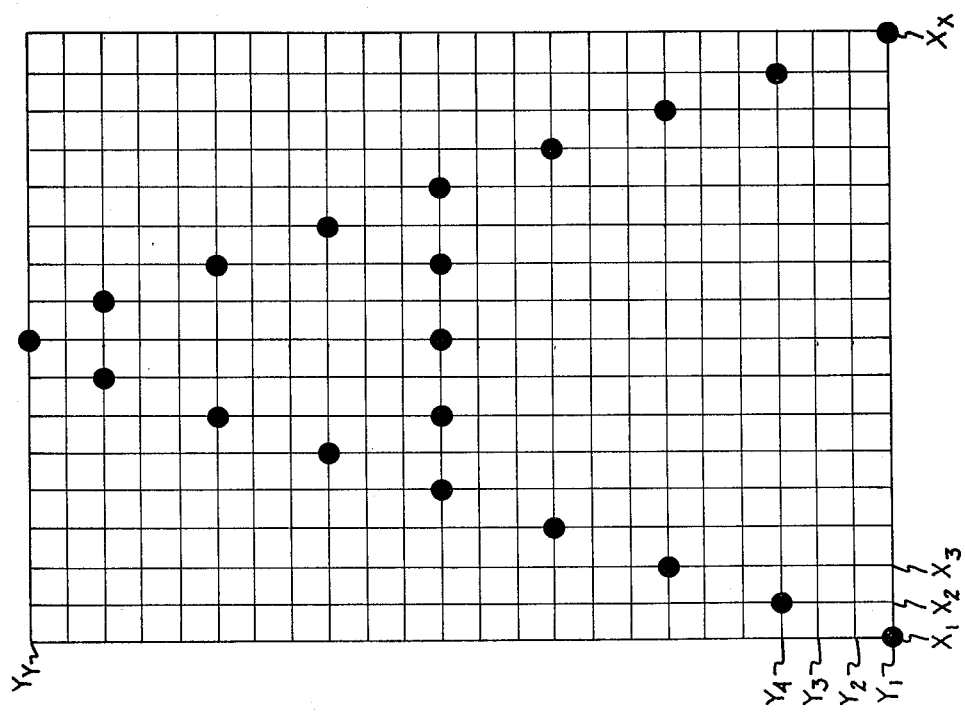
FIG. 2 is a diagram of the character matrix for standard speed printing.

In a typical system, the dot selector 15 selectively charges the ink dots in accordance with a data input 35 and character matrix memory 40. Data input 35 designates the character to be printed by the dot selector 15. Dot selector 15 then accesses the character matrix memory 40 and character matrix memory 40 relays to dot selector 15 the preprogrammed dot position information for the designated character. The designated character dot position information is in the form of X adjacent and parallel columns $X_1, X_2, X_3 \ldots X_x$ of Y potential dot positions $Y_1, Y_2, Y_3 \ldots Y_y$. See FIG. 2. In charging dots, the selector 15 charges the dots starting with the first scan $X_1$. Having received the dot matrix position information for the designated character, selector 15 codes, or charges, the dots starting with scan $X_1$ and moving sequentially to scan $X_x$. Scan $X_1$ contains the potential dot positions $Y_1, Y_2, Y_3 \ldots Y_y$. The frequency of dots projected from the dot generator is fixed. The dots projected out of the dot generator form a train and each successive dot is coded with the next potential matrix position. Hence, if we label the dots moving through the dot selector 15 in sequence $d_1^{X1}$, $d_2^{X1}, d_3^{X1} \ldots d_y^{X1}, d_1^{X2}, d_2^{X2} \ldots$, dot $d_1^{X1}$ will be coded with the position information for $Y_1$ of scan $X_1$, dot $d_2^{X1}$ will be coded with the position information $Y_2$ of scan $X_1$, etc. The scan $X_1$, thus, moves through vertical steps. Position information $Y_1$ can either be a graded charge or no charge depending on the designated character to be printed. In FIG. 2 an "A" is shown superimposed upon the matrix. If the "A" were being printed, in scan $X_1$ dot $d_1^{X1}$ would be coded with position information $Y_1$ which would, in this case, be a low graded charge causing a small deflection of drop $d_1^{X1}$ in drop deflector 25 before it impinges on the recording medium 10 at matrix position $(X_1, Y_1)$. The position information of potential drop positions $Y_2$-$Y_y$ of scan $X_1$, however, would be no charge, or a zero charge, and the dots coded with the position information for potential dot positions $Y_2$-$Y_y$ of scan $X_1$ would, therefore, be undeflected by dot deflector 25 and would be collected by the gutter 30. Once scan $X_1$ is completed, dot selector 15 immediately begins scan $X_2$ starting with position $Y_1$ for scan $X_2$. Referring to FIG. 2, it can be appreciated that all dots of the $X_2$ scan will be charged, or coded, with a position information of no charge, or zero charge, except for dot $d_4^{X2}$ which would receive a graded charge signal at the $Y_4$ level and be deflected by drop deflector 25 to impinge at matrix position $(X_2, Y_4)$ on recording medium 10. The dot selector 15 continues to code dots in accordance with the dot position information of scans $X_3, X_4, X_5 \ldots X_x$ to complete the character. Once the character is completed, the dot matrix position information for the next character is obtained from character matrix 40 and that character is printed in the same manner. Since the dot generator 5, dot selector 15 and dot deflector 25 are moving at speed S horizontally as the scans print the dots in vertical columns, a line of print is produced horizontally across the recording medium. Once the line is completed, the medium is advanced and the next line is printed. Note that if bidirectional printing is employed with the bidirectional skew compensation means of U.S. Pat. No. 4,321,609 referred to above, a qualification is in order in that scans will be ascending when printing in one direction, but descending when printing in the opposite direction. Control circuitry would be employed to reverse the direction of scanning as print direction was reversed.

In some systems the dot generator 5, dot selector 15 and dot deflector 25 remain stationary and the recording medium 10 is moved. In either case, the same basic principals described above apply.

The printer so far described prints at a standard speed S. It is desirable to have a capability for high-speed printing in addition to the standard printing speed. In the past, higher speed printing has been accomplished by the elimination of alternate scans of a character matrix. This solution, however, introduces as slant into the characters and permits only unidirectional printing as has been previously discussed.

The solution of the present invention is to consider the print speed S to be limited by scan time T. Thus, rather than eliminate whole scans, scan time is reduced in proportion to the increase in print speed. Consequently, if the print speed S is increased by a factor Z, the scan time T must be reduced to $(1/Z)(T) = T/Z$. FIG. 1 shows the presently preferred means for reducing the scan time T to T/Z. With reference to FIG. 2, a standard scan has Y potential dot positions. In the preferred embodiment, where speed S is increased by a factor Z, the standard scan is converted to a high-speed scan with $(1/Z)(Y) = Y/Z$ potential dot positions. By reducing the number of potential dot, or matrix, positions per scan by the factor $1/Z$, the scan time is reduced to T/Z. To reduce the potential dot positions of a scan to Y/Z, a separate character matrix memory 45 is provided, see FIG. 1. While the scans of the standard speed matrix memory 40 each have Y potential dot positions, the scans of high-speed matrix memory 45 have Y/Z potential dot positions. A speed selector 50 is provided so that the operator can select either standard speed printing or high-speed printing.

Figure 3:
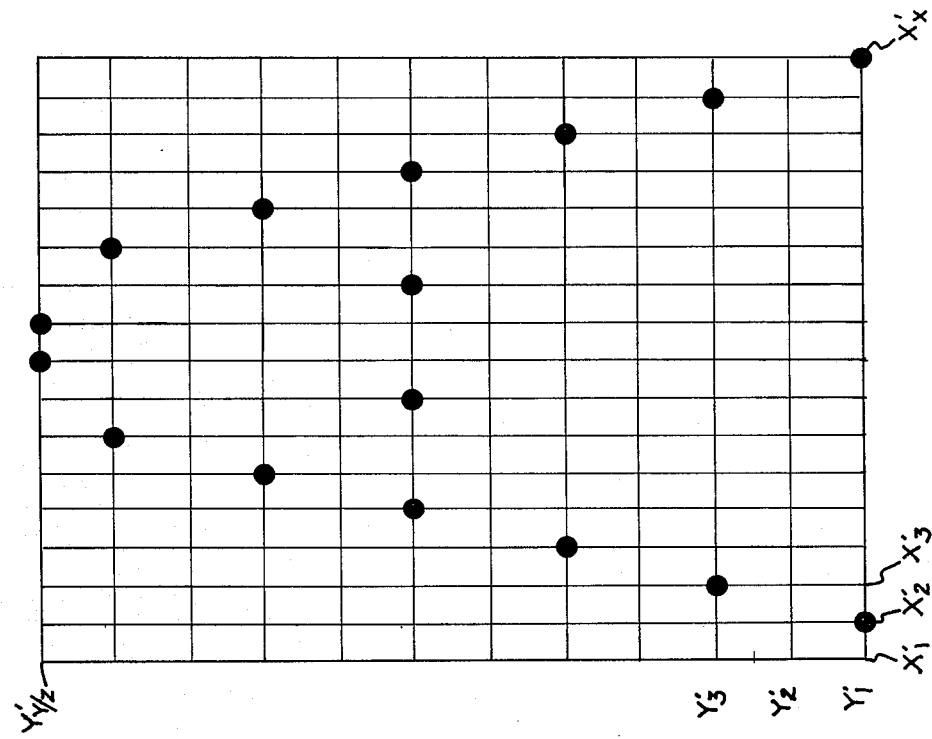
FIG. 3 is a diagram of the character matrix for high-speed printing at double the standard printing speed.

In the presently preferred embodiment, it is believed that high-speed printing would be twice the speed of standard speed printing. Thus, Z would equal 2, and if the standard printing speed is $S_1$, the speed $S_2$ for high-speed printing would be $S_2 = Z(S_1) = 2S_1$. There are Y potential dot positions in standard speed printing. Hence, there would be $Y/Z = Y/2$ potential dot positions in high-speed printing reducing scan time to $T/Z = T/2$. FIG. 3 shows the character matrix for high-speed printing where $Z = 2$. Note that while there are the same number of scans $X_1, X_2, X_3 \ldots X_x$, the number of potential dot positions $Y_1', Y_2', Y_3' \ldots Y_{y/2}'$ is reduced from Y to Y/2. The letter A printed at print speed $S_2$ is superimposed on the matrix.

Referring back to FIG. 1, if the operator selects standard printing speed $S_1$, at speed selector 50, dot selector 15 will access standard speed character matrix 40 and will print characters according to the matrix of FIG. #2. If, however, the operator selects the high-speed printing speed $S_2$ at speed selector 50, dot selector 15 will access high-speed character matrix 45 and will print characters according to the matrix of FIG. #3. The present invention, therefore, comprises a method and apparatus for reducing scan time in proportion to the increase in print speed to eliminate character slant and permit bidirectional printing in a high-speed printing mode.

Having disclosed the presently preferred embodiment of the invention, various alterations and modifications will be obvious to those skilled in the art, and therefore, the invention is intended to be limited only by the scope of the appended claims.

I claim:

1. In a dot matrix printer having a recording medium and a means for forming dots in matrix positions on said recording medium to form characters on said recording medium, said dot forming means forming said characters by producing adjacent and parallel scans of seqentially formed dots on said recording medium, each of said scans being comprised of a column of potential dot positions and each of said scans requiring a scan time T to complete, and also having a means for producing relative movement at a speed S between said dot forming means and said recording medium in a lateral direction with respect to said dot scans, a method of printing at variable speeds, comprising the steps of:

changing the speed S of said relative movement between said recording medium and said dot forming means by a factor of Z;

providing character matrix memories corresponding to each change of speed S, each of said matrix memories having preprogrammed dot matrix position information for said character with the corresponding characters in each memory containing a different number of dot locations in each corresponding scan; and simultaneously changing the scan time T by a factor of 1/Z in response to said change in speed D said scan time reduced by changing the number of said dot locations in each scan by a factor of 1/Z.

2. In a dot matrix printer, having a recording medium and a means for forming dots in matrix positions on said recording medium to form characters on said recording medium, said dot forming means forming said characters by producing adjacent and parallel scans of sequentially formed dots on said recording medium, each of said scans being comprised of a column of Y potential dot positions and each of said scans requiring a scan time T to complete, further including a means for producing relative movement at a speed S between said dot forming means and said recording medium in a lateral direction with respect to said dot scans, the improvement comprising:

a speed selector for changing the speed S of said relative movement between said recording medium and said dot forming means by a factor of Z, said speed selector being operable to select a standard speed $S_1$ or a high speed $S_2 = Z(S_1)$;

a means simultaneously changing said scan time T by a factor 1/Z in response to said change in speed S, said scan time changing means comprising a means for changing the number of potential dot positions per scan from Y to Y/Z potential dot positions in response to the change in speed S by the factor Z;

a data input included in said dot forming means which designates a character to be printed;

a character matrix memory corresponding to each selectable speed, each of said matrix memories having preprogrammed dot matrix position information for said designated character, said dot matrix position information of said standard speed character matrix memory comprising X adjacent and parallel columns of Y potential dot positions, each of said columns of Y potential dot positions comprising a standard scan, each of said standard scans requiring a standard time period T to complete; said dot matrix position information of said high-speed character matrix memory comprising X adjacent and parallel columns of Y/Z potential dot positions, each of said columns of Y/Z potential dot positions comprising a high-speed scan requiring a high-speed time period T/Z to complete.

3. The dot matrix printer of claim 2 wherein said dot forming means comprises a means for projecting dots towards said recording medium and a means for selecting dots to be recorded on said recording medium in matrix positions to form characters on said recording medium, said data input designating to said selecting means a character to be printed, said selecting means accessing said standard speed character matrix if said standard speed $S_1$ has been selected, and accessing said high-speed character matrix when said high-speed $S_2$ has been selected; said dot projecting means projecting dots through said dot selecting means towards said recording member; said standard speed character matrix memory comprising standard scans, each of said standard scans being comprised of Y potential dot positions $Y_1, Y_2, Y_3 \ldots Y_y$; said high-speed matrix memory comprising high-speed scans, each of said high-speed scans being comprised of Y/Z potential dot positions $Y_1', Y_2', Y_3' \ldots Y_{y/z}'$; when said standard speed $S_1$ is selected, said selecting means sequentially applying $Y_1, Y_2, Y_3 \ldots Y_y$ potential dot position signals to said dots as said dots pass through said selecting means to produce a sequence of coded dots $d_1^{X1}, d_2^{X1}, d_3^{X1} \ldots d_y^{X1}, d_1^1, d_1^{X2}, d_2^{X2} \ldots$, said coded dots either being recorded on said recording member in scan matrix positions or collected by a gutter; when said high-speed $S_2$ is selected, said selecting means sequentially applying $Y_1', Y_2', Y_3' \ldots Y_{y/z}'$ potential dot position signals to said dots as said dots pass through said selecting means to produce a sequence of coded dots $d_1^{X1'}, d_2^{X1'}, d_3^{X1'} \ldots d_y^{X1}/z'$, said coded dots either being recorded on said recording member in scan matrix positions or collected by a gutter.

4. In an ink jet printer having a nozzle which emits a stream of ink drops toward a recording medium, a charging electrode which selectively charges said ink drops in accordance with a data input, a deflection means for deflecting ink drops charged by said electrode vertically in proportion to the charge on said ink drops, a carriage for supporting said nozzle and said charging electrode, and a means for moving said carriage laterally with respect to said record receiving member at a speed S to print desired characters on said recording medium in a dot matrix pattern, said characters being formed by adjacent and parallel scans of sequentially formed dots on said recording medium, each of said scans being comprised of a column of potential ink dot positions and each of said scans requiring a scan time T to complete, the improvement comprising:

a speed selector for changing the speed S of said carriage by a factor of Z, said speed selector being operable to select a standard speed $S_1$ or a high speed $S_2 = Z(S_1)$;

a means for simultaneously changing said scan time T by a factor 1/Z in response to said change in speed S, said scan time changing means comprising a means for changing the number of potential ink dot positions per scan from Y to Y/Z potential ink dot positions in response to the change in speed S by the factor Z;

a data input included in said dot forming means which designates a character to be printed, a character matrix memory corresponding to each selectable speed, each of said matrix memories having preprogrammed dot matrix position information for said designated character; said dot matrix position information of said standard speed character matrix memory comprising X adjacent and parallel columns of Y potential dot positions, each of said columns of Y potential dot positions comprising a standard scan, each of said standard scans requiring a standard time period T to complete; said dot matrix position information of said high-speed character matrix memory comprising X adjacent and parallel columns of Y/Z potential dot positions, each of said columns of Y/Z potential dot positions comprising a high-speed scan requiring a high-speed time period T/Z to complete.

* * * * *